United States Patent [19]

Fussi et al.

[11] Patent Number: 5,340,932
[45] Date of Patent: Aug. 23, 1994

[54] SUBSTANCES WITH HEPARIN-LIKE STRUCTURE AND THEIR METHOD OF PRODUCTION

[75] Inventors: Fernando Fussi, Lugano, Switzerland; Victor Diáz, Buenos Aires, Argentina; Ricardo H. Dománico, Buenos Aires, Argentina; Esteban P. Fuentes, Buenos Aires, Argentina

[73] Assignee: Ajorca S.A., Buenos Aires, Argentina

[21] Appl. No.: 946,034

[22] Filed: Sep. 16, 1992

Related U.S. Application Data

[63] Continuation of Ser. No. 567,124, Aug. 14, 1990, abandoned.

[51] Int. Cl.$^5$ .......................... C07H 1/00; C08B 37/10
[52] U.S. Cl. .......................... 536/21; 536/54; 536/124
[58] Field of Search .................. 514/54, 56; 536/21, 536/124, 54, 55.1

[56] References Cited

U.S. PATENT DOCUMENTS

| | | | |
|---|---|---|---|
| 3,033,750 | 5/1962 | Velluz | 536/21 |
| 4,489,066 | 12/1984 | Fedeli | 514/54 |
| 4,692,435 | 9/1987 | Lormeau et al. | 514/56 |
| 4,727,063 | 2/1988 | Naggi et al. | 514/56 |
| 4,816,446 | 3/1989 | Feller et al. | 536/21 |
| 4,882,318 | 11/1989 | Vlodavsky et al. | 514/56 |
| 5,013,724 | 5/1991 | Petitou et al. | 536/21 |
| 5,032,679 | 7/1991 | Brandley et al. | 536/21 |

FOREIGN PATENT DOCUMENTS

| | | | |
|---|---|---|---|
| 0133078 | 2/1985 | European Pat. Off. | 536/21 |
| 0140781 | 5/1985 | European Pat. Off. | 514/56 |
| 0040144 | 11/1991 | European Pat. Off. | 536/55.1 |
| 3422518 | 12/1985 | Fed. Rep. of Germany | 536/21 |

OTHER PUBLICATIONS

Danishefsky et al.; Arch. Biochem. Biophys. 90:114–121 (1960).
Nagasawa et al; J. Biochem. 81:989–993 (1977).
Höök et al; Analytical Biochemistry 119:236–245 (1982).
Nagasawa et al; Carbohydrate Research 111:273–281 (1983).
Ayotte et al; Carbohydrate Research 145:267–277 (1986).
Irimura et al; Biochemistry 25(18):5322–5328 (1986).

*Primary Examiner*—Johnnie R. Brown
*Assistant Examiner*—Kathleen Kahler Fonda
*Attorney, Agent, or Firm*—Birch, Stewart, Kolasch & Birch

[57] ABSTRACT

A process for the synthesis of a new N-acetylated Heparin derivative is disclosed which includes a reaction of a N-desulfated Heparin with acetic anhydride. The new compound so obtained and pharmaceutical compositions containing it, exhibit antithrombotic and fibrinolytic properties with low anticoagulant activity.

4 Claims, 4 Drawing Sheets

SUBSTANCES WITH HEPARIN-LIKE STRUCTURE AND THEIR METHOD OF PRODUCTION

This application is a continuation of application Ser. No. 07/567,124 filed on Aug. 14, 1990, now abandoned.

Natural glucosaminoglycans obtained by extraction, (GAG), such as the heparan-sulfate (HS), have been isolated and characterized (Jorpes, J.-Gardell, S.JBC 176, 267–276). Their structure is similar to that of heparin, varying fundamentally in the degree of N-acetylation. In heparin, the —NH group of the glucosamine is preferably sulfated, whereas, in HS, it is N-acetylated.

As a consequence of said structural difference, HS exhibits peculiar biological characteristics, different from those of the heparin:

1) HS exhibits low anticoagulent activity when tested in vitro (APTT, anti-X).
2) HS exhibits profibrinolytic activity (release of the plasminogen tissue activator), when used in humans or in laboratory animals.
3) HS exhibits a superior bioavailability to that of heparin.

Therefore, said substances are especially relevant to cardiovascular medicine, mainly, in long-lasting therapies intended to prevent the formation of microthrombus, as well as to contribute to the dissolution thereof. This can be achieved with little risk of hemorrhages and with reduced side effects.

Obviously, these natural mucopolysaccharides cannot be extracted in large scale, due to their low concentration in the tissue mass. This can limit significatively its extensive use in the therapeutical field.

Now, in accordance with the present specification, a process has been developed, which provides for the production of pure N-acetylated compound with a heparin-like structure with good yields, starting with heparin as raw material.

The process of the invention is based upon a controlled hydrolysis of the heparin with N-desulfation without depolymerization, followed by the introduction of the acetyl group in the specific position of the aminic N, through a reaction using acetic anhydride.

Figure 4:
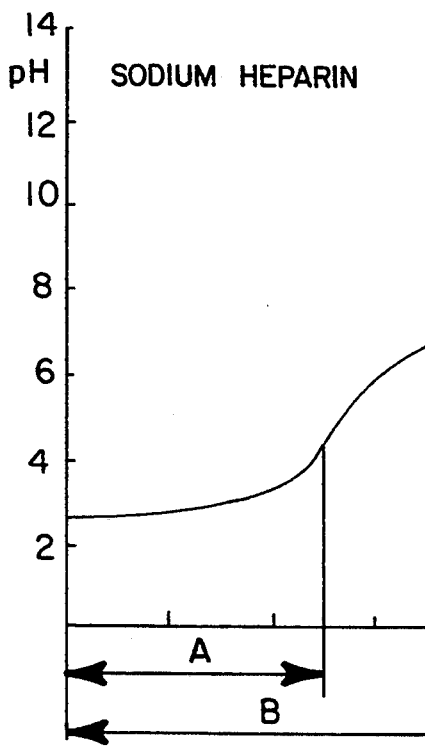
FIG. 4 presents a titration curve of sodium heparin.
Figure 5:
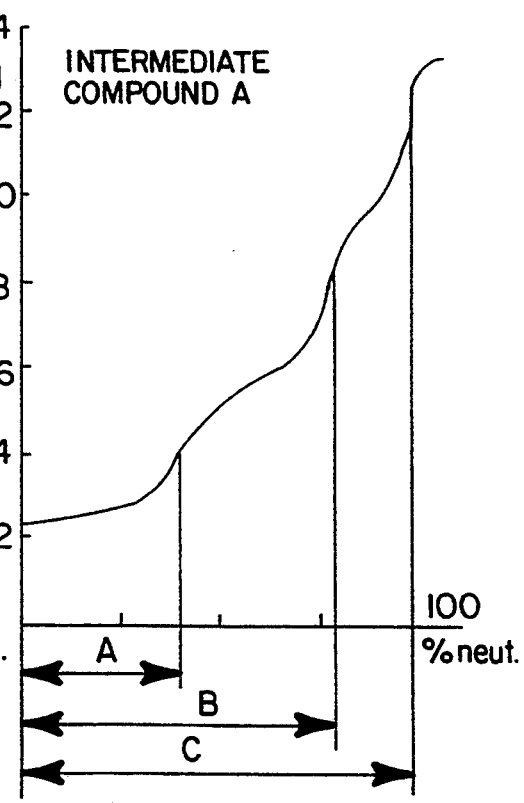
FIG. 5 presents a titration curve of intermediate A.
Figure 6:
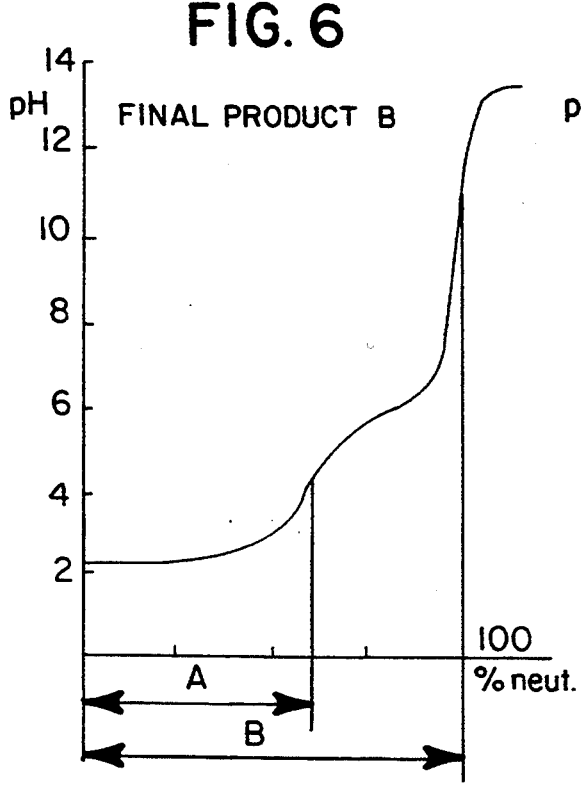
FIG. 6 presents a titration curve of final product B.
Figure 7:
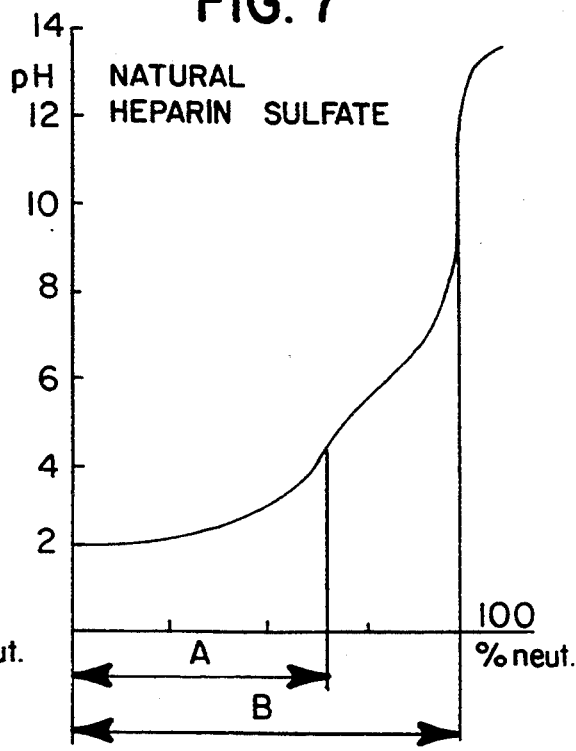
FIG. 7 presents a titration curve of natural heparin sulfate.

For each of FIGS. 4, 6 and 7, B-A=carboxy uronic group; A=sulfate group. For FIG. 5, B-A=carboxy uronic group; C-(B-A)=sulfate group; C-B=free amine group.

The heparin desulfation is achieved specifically on the amino group, without hydrolyzing the O-sulfate group and without producing hydrolysis of the glycosidic bond or other parasitic reactions. This has already been described by Inoue and Nagasawa (1975) "Inoue, Y.-Nagasawa, K. Carbohyd, Res. 46, 87–95 (1976)". However, this method cannot be easily conducted on a large scale, since it works on a heparin-pyridinic complex dissolved in aqueous or methanolic dimethylsulfoxide with its associated problems, such as for example: the separation of the complex from the reacting solvent, the quantitative elimination of the pyridine, the recovery of expensive solvents, etc.

On the contrary starting from calcium heparin, due to the counterion size, a selective N-desulfation in an acidic aqueous medium can be achieved, without causing structural alterations and without affecting the medium MW.

Particularly, the browning of the product and the hydrolysis of the O-sulfate group are avoided.

Then, the partially N-desulfated heparin (Intermediate A), is subjected to the acetylation reaction.

The heparin acetylation has been described by Danishefsky (Danishefsky, N. Meth. Carb. Chem. 5, (85), 11) and Nagasawa as well (Inoue, Y.-Nagasawa, K. Carbohyd, Res. 46, 87–95 (1976)). Both of these methods work great with quantities of acetic anhydride, a pH of 6.5–7.0 and a wide range of temperatures.

In these conditions, and working at low temperatures (0°–5° C.), parasitic O-acetylation is produced over the free —OH of the disaccharidic unit.

It has been discovered, and it is the object of the present invention, that when using a practically stoichiometric quantity of the acetic anhydride 1–1.1 moles $(CH_3CO)_2=O/Mol$ of the free-amino N, previously determined by the titration curve and at a pH between to 9.3 and 9.5 (maximum limit compatible with the acetic anhydride hydrolysis), the N-acetylation product is exclusively produced, even working at 25°–30° C.

At this temperature, the reaction is fast and complete within 15 minutes. Even if the reaction lasts for a longer time, it does not produce secondary reactions.

The obtained product (final product B) has an extremely constant composition and is represented by a molecule chemically well characterized, with a precise analytical description, as defined in the following table and figures.

To better identify the object product of the present invention the $^{13}$C-NMR characterization of the product is hereby described.

The NMR spectrum of the final product B (FIG. 1), was determined in $D_2O$ solution, at 75 MHz, by means of a Bruker Mod. CxP-300 spectrometer. For comparison purposes the spectra of a standard heparin (FIG. 2) and of heparan-sulfate (HS, FIG. 3) are shown. These spectra correspond to those known in the literature (B. Casu et al, Arzneim-Forsch. (Drug Research) 33, 135–142, 1983).

Figure 1:
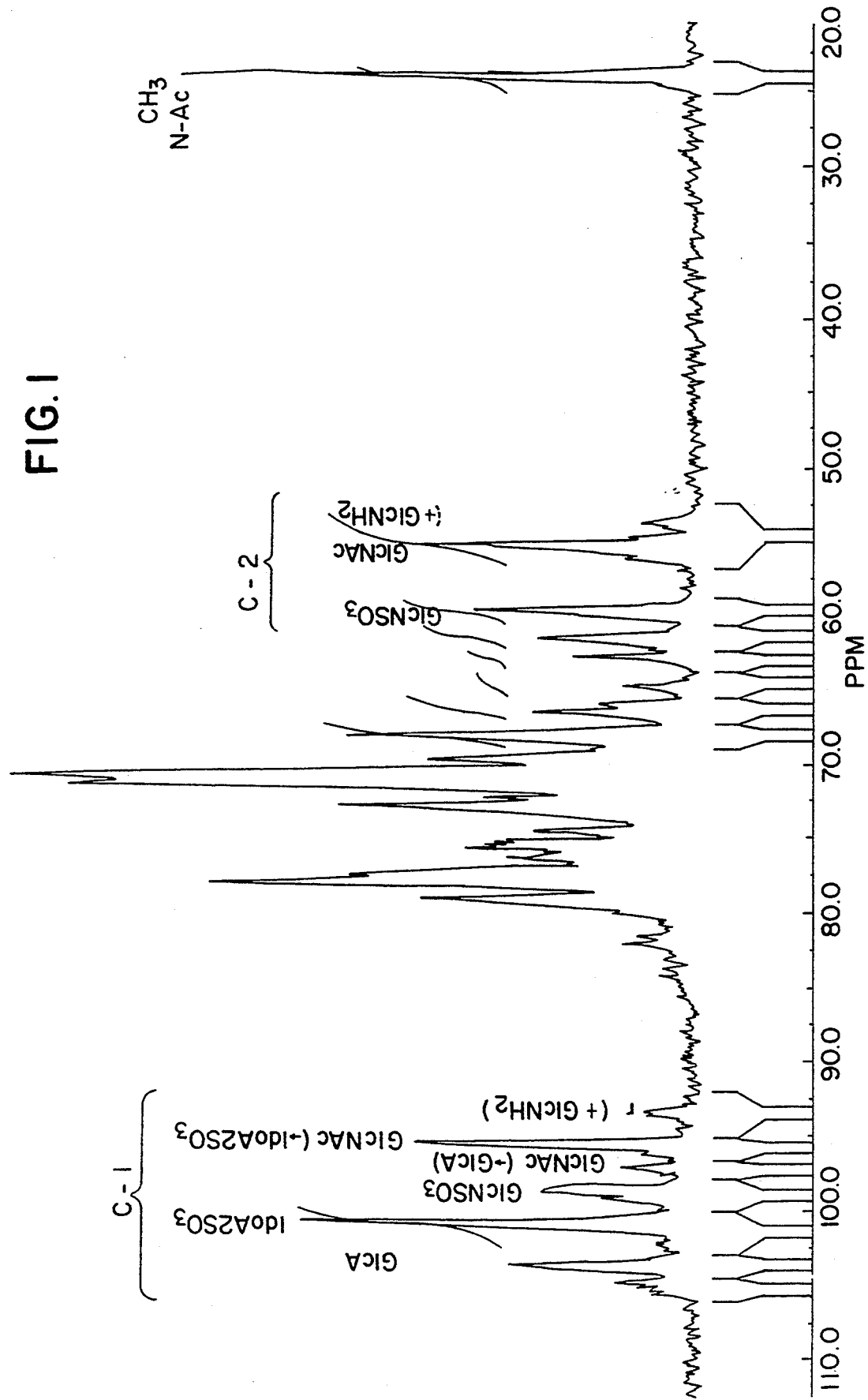
FIG. 1 shows the NMR spectrum of product B.

In FIG. 1, the peaks in the region 90–95 ppm (due to C-1 anomeric carbon) and in the region 53–61 ppm (due to C-2 of amino sugar units) are particularly suitable in order to identify the different uronic units, to measure the amount of said units, and to determine the sulfate group distribution on the uronic and hexosamine units.

In the present text the following abbreviations have been adopted:

L-iduronyl-2-sulfate=Ido A2SO$_3$
D-glucuronic acid=GlcA
Glucosamine N-sulfate=GlcNSO$_3$
N-acetyl glucosamine=GlcAc
Glucosamine with no substituted amine groups=GlcNH$_2$
r=reducing terminal groups, mainly referring to hexosaminic units.

The following relative percentages were calculated by considering the areas under the characteristic peaks of different groups:

IdoA2SO$_3$=68.2%; GlcA=31.8% referred to total uronic acids;

GlcNSO$_3$=37.8%; GlcNAc bound to IdoA2-SO$_3$=37.8%; GlcNAc bound to

GlcA=11.0%; reducing GlcN=13.4%, with respect to total hexosamines (C-1 peaks evaluated).

From the area under C-2 and CH$_3$ (N-acetyl) peaks the GlcNSO$_3$ groups percentage amounts to 36.2%, and the percentage of total GlcNAc units amounts to 53%.

The product is analogous to heparin (because of high IdoA2SO$_3$ unit content 71–91% of total uronic acid in heparin) and to heparan-sulfate (because of high N-acetyl group 58% content of total glucosamine heparan-sulfate); but it differs in a considerable measure from the above-mentioned glycosaminoglycuronans, because of predominant GlcNAc→IdoA2SO$_3$ sequences which are in minor amounts in both the aforesaid GAG's.

The example which follows, describes the original process for the production of the heparin-like N-acetylated compound (final product B) obtained from calcium heparin. Based on laboratory models this compound shows fibrinolytic and antithrombotic activity, and lacks anticoagulant activity. Therefore, the hemorrhaging risk is low. The antithrombotic activity has been tested using as a model a rat's tail, according to Bekemeyer (Bekemeyer H.-Hirschelmann, "Agents and Actions". Vol. 16 pag. 446 (1985)).

The fibrinolytic activity ex-vivo was tested on the plasma of rabbits injected with the product through the evaluation of FDP (Fibrin Depolymerization Peptides), using the Bohringer Diagnostica Kit.

The method of production, as well as the complexes obtained and their use as fibrinolytic and protecting agents of thrombosis, are part of this invention.

The purification of the final product B and of the intermediate A are carried out following the general techniques, using ammonium quaternary salts and ethanol in saline solution, as described by Scott (Scott, J. Meth. Bioch. Analysis VIII 145–197 (1960)).

EXAMPLE

1) Preparation of the calcium heparin:

100 g of heparin sodium 150 IU/mg are dissolved in distilled water, a quantity sufficient for 1 liter of solution (10%). It is heated at 50° C. and with agitation, 120 g of cetyltrimethylammonium bromide (CTAB) dissolved in 1 liter of distilled water, are slowly added.

The precipitated product is left still for 1 hour at said temperature and is separated by centrifugation. It is washed twice with 100 ml each time, of 1% solution of CTAB in water, and finally the solid substance obtained is dissolved in 1 liter of 2M CaCl$_2$ solution in water. Then, the polysaccharide is precipitated adding 1 volume of ethanol (96% by volume). It is allowed to settle during all of the night, the supernatant is put aside and the solid substance obtained is redissolved in 1 liter of 2M CaCl$_2$ in aqueous solution.

The clear solution is precipitated again with a volume of ethanol (96% by volume). The solid substance is settled, redissolving for a second time in 1 liter 2M CaCl$_2$. The remaining CTAB is eliminated by adding bentonite according to Scott (Scott, J. Meth. Bioch. Analysis VIII, 145–197 (1960)). The bentonite is eliminated by filtration and the clear liquid is precipitated for the last time with 1 volume of ethanol.

The solid substance is anhydrated with ethanol and dried in a vacuum drying chamber.

Then, 90 g of calcium heparin are obtained with a degree of sodium less than 0.1%.

2) Preparation of the intermediate A:

The 90 g of calcium polysaccharide are dissolved in HCl 0.25M, a quantity sufficient to obtain a 10% solution, and heating at 80° C. After 2 hours, the N-desulfation reaction is practically completed, which is evidenced by the absence of anticoagulant activity of the liquid in reaction, and the appearance of a strong calcium sulfate precipitate.

When the desired reaction is completed, the reaction is stopped adjusting the pH to 7 by adding a 10M NaOH solution.

A sufficient quantity of 10% w/v Na$_2$CO$_3$ solution is added to complete precipitation of CaCO$_3$, and the precipitate obtained is eliminated by filtration.

The N-desulfated polysaccharide is isolated from the liquid adding 1 vol. ethanol and it is settled during the whole night. The heparaminic material is anhydrated and dried in vacuum drying ovens.

Then, 60 g of material are obtained containing 50% of amino free groups (Intermediate A).

3) Preparation of the final product B:

50 g of intermediate A are dissolved in distilled H$_2$O, a sufficient quantity for 1 liter of solution (5% w/v) and the pH is adjusted to 9.5 with 10M NaOH solution. The temperature is raised to 25°–28° C., and under agitation 5 ml of acetic anhydride are added drop by drop, maintaining the pH at 9.3–9.5 with a NaOH solution. The aggregate of acetic anhydride takes approximately 5 minutes and the reaction time under agitation is 30 minutes, after which 10 g of NaCl are added. Then, all the liquid is precipitated in 1 vol. ethanol and settled for the whole night.

After it has been precipitated and settled, the paste is dissolved in 500 ml of sterile water, 5 g of NaCl are added, the pH is adjusted to 6.0 with 6M HCl and filtration is started using depyrogenic plates and sterilizing membranes of 0.8–0.22 U. The liquid filtered is precipitated with 1 vol. filtered ethanol. It is anhydrated and dried in vacuum drying ovens at 60° C., for 12 hours.

55 g of N-acetylated product are obtained, without free amino groups, but with a chemical composition (see the titration curve), analytical characteristics, and biological and pharmacological properties similar as a whole to the ones of natural HS.

The analytical typification of the original heparin, the intermediate A complex and the final product B are shown here below.

| Analytical Determ. | Sodium Heparin | Intermediate A | Final Prod. B |
| --- | --- | --- | --- |
| APPT Activity | 150 IU/mg | 10 IU/mg | 10 IU/mg |
| Anti-X Activity | 150 IU/mg | 10 IU/mg | 10 IU/mg |
| N-acetyl | 0.8% | 0.9% | 4.3% |
| Uronic acid | 30.0% | 35.0% | 31.0% |
| Hexosamines | 30.0% | 35.0% | 32.0% |
| Organic sulfate (as S) | 11.0% | 8.2% | 7.8% |
| Specific rotation | +36° | +40° | +40° |
| Molar Relation uronic/hexosamine/S/acetyl | 1:1:22:0.1 | 1:1:1.7:0.1 | 1:1:1.7:0.5 |
| NH/N total | 0.0 | 0.5 | 0.0 |

Figure 2:
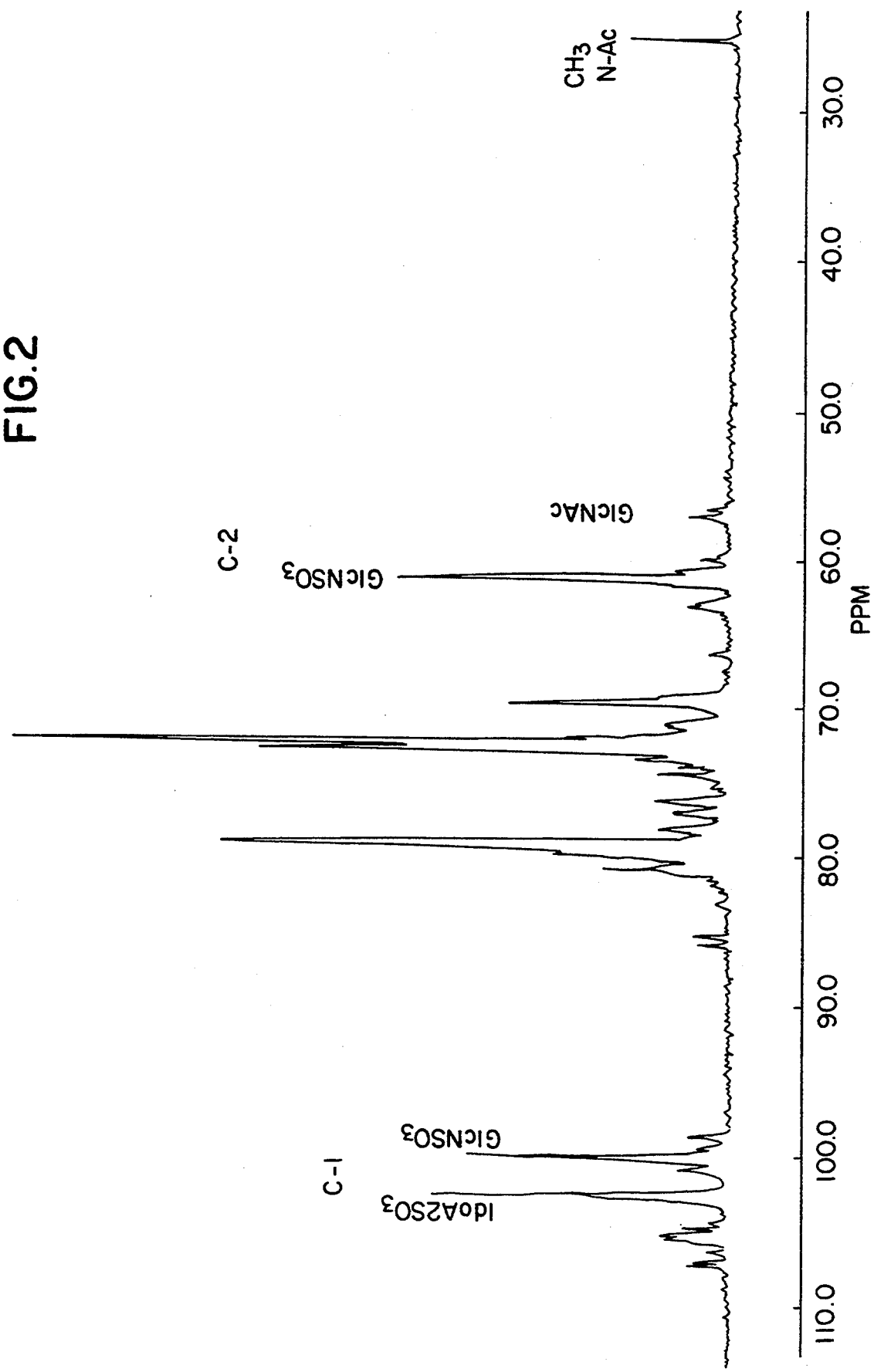
FIG. 2 shows the NMR spectrum of a heparin standard.
Figure 3:
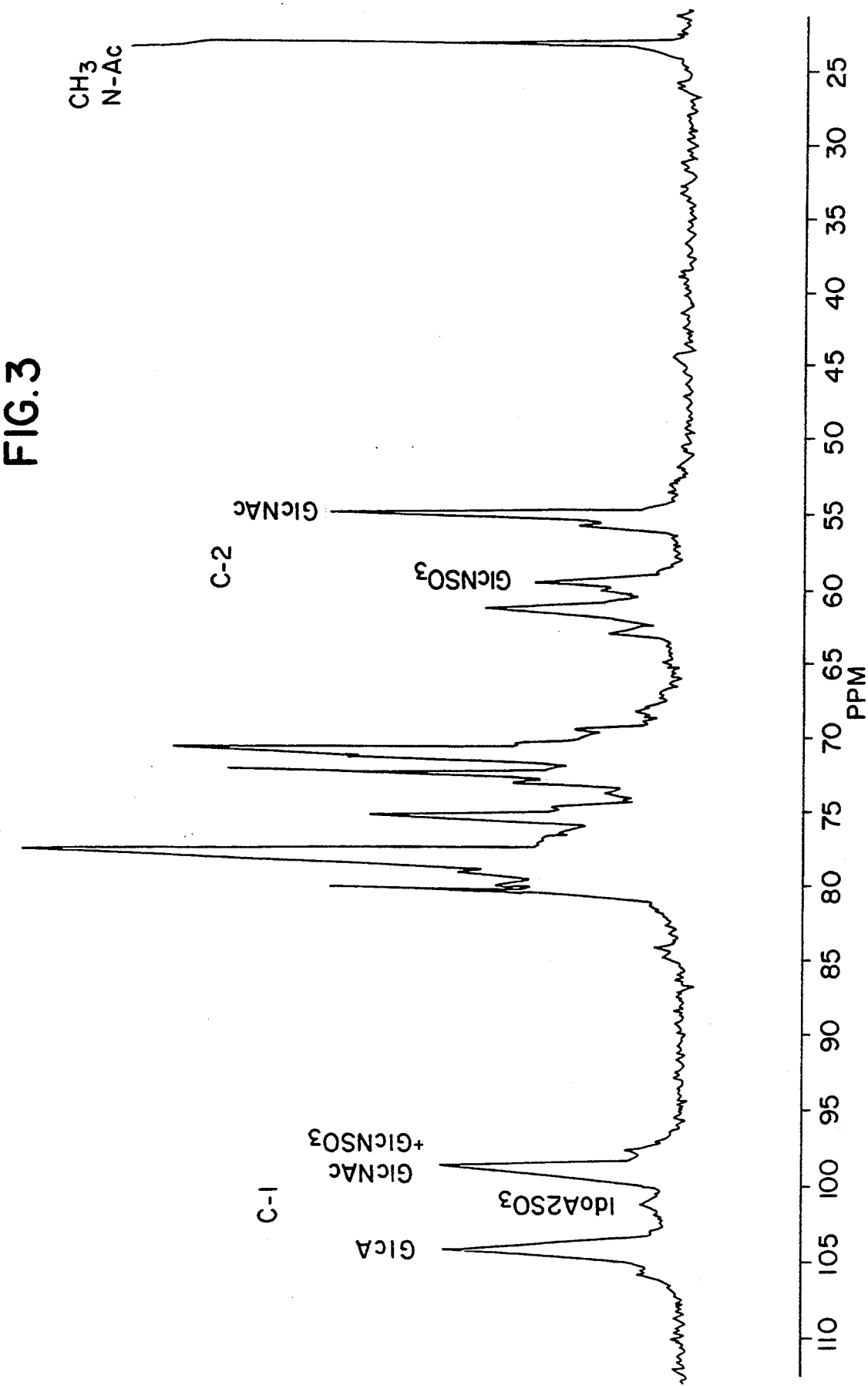
FIG. 3 shows the NMR spectrum of heparin sulfate.

The FIGS. 1 to 3 are the $^{13}$C-NMR spectra of the following compounds:

FIG. 1: final product B; FIG. 2: Heparin; FIG. 3: Heparan-sulfate.

The FIGS. 4 to 7 represent evaluations as per the following details:

FIGS. 4,6,7:
B-A=carboxylic uronic groups
A=sulfate groups

FIG. 5:
B-A=carboxylic uronic groups
C-(B-A)=sulfate groups
C-B=free amino groups The invention being thus described, all such modifications as would be obvious to one skilled in the art are intended to be included within the scope of the following claims.

We claim:

1. A process for the preparation of an N-acetylated derivative of heparin which comprises the following steps:
   (a) heating heparin in its calcium salt form at about 80° C. in an aqueous acidic solution of 0.25M HCl as an hydrolysis step in order to partially desulfate the N-sulfate amino group without hydrolysis of O-sulfated groups and to form a first reaction mixture;
   (b) adding to the first reaction mixture NaOH so as to adjust the pH to 7 and then adding $Na_2CO_3$ solution thereto so as to cause precipitation of calcium as $CaCO_3$ and form a second reaction mixture;
   (c) separating by filtration insoluble calcium, sulfate and carbonate from said second reaction mixture to form a third reaction mixture;
   (d) acetylating the free amino groups present in said third reaction mixture by dissolving in water the third reaction mixture, adjusting the pH to 9.5 with NaOH solution, and adding acetic anhydride in an amount corresponding to 1–1.1 moles per mole of free amino groups, while maintaining the temperature at 25°–30° C. and the pH at 9.3–9.5 by addition of NaOH to form a fourth reaction mixture in an aqueous solution; and
   (e) precipitating an N-acetylated derivative final product from the aqueous solution of said fourth reaction mixture by addition of ethanol, and purifying said final product by filtration.

2. An N-acetylated derivative of heparin having the following characteristics:
   absence of O-acetylated groups;
   anticoagulant activity (APTT Anti-X) of less than 10 IU/mG
   N-acetyl content (expressed as $CH_3CO-$) of 3 to 7% by weight corresponding to a degree of N-acetylation of from 40% to 90%;
   uronic acids content of 31%±1% by weight;
   hexosamines content of 32%±1% by weight;
   Organic sulfate content (as S) of 8%±1% by weight;
   molar ratio of uronic/hexosamine/S/acetyl of 1/1/1.5–1.7/0.4–0.9; and
   specific optical rotation of greater than +35°.

3. A pharmaceutical composition comprising an effective amount of the product of claim 2 having antithrombic and fibrinolytic properties and low anticoagulant activity in admixture with at least one pharmaceutically acceptable excipient.

4. An N-acetylated derivative of heparin according to claim 2 having the following characteristics:
   N-acetyl content (expressed as $CH_3CO-$) of 4.3% by weight;
   uronic acids content of 31% by weight;
   hexosamines content of 32% by weight;
   organic sulfate content (as S) of 7.8% by weight;
   molar ratio of uronic/hexosamine/S/acetyl of 1/1/1-7/0.5;
   and
   specific optical rotation of 40°.

* * * * *

UNITED STATES PATENT AND TRADEMARK OFFICE
CERTIFICATE OF CORRECTION

PATENT NO. : 5,340,932
DATED : August 23, 1994
INVENTOR(S) : Fernando FUSSI et al.

It is certified that error appears in the above-identified patent and that said Letters Patent is hereby corrected as shown below:

On the title page item, 63 and 51 insert the following:

-- [30]   Foreign Application Priority Data

August 18, 1989   [AR]   Argentina .......... 314703 --

Signed and Sealed this

Twenty-ninth Day of November, 1994

Attest:

BRUCE LEHMAN

*Attesting Officer*   *Commissioner of Patents and Trademarks*